(12) United States Patent
Gage et al.

(10) Patent No.: US 8,612,348 B1
(45) Date of Patent: Dec. 17, 2013

(54) SYSTEMS AND METHODS FOR INTERFACING MERCHANTS WITH THIRD-PARTY SERVICE PROVIDERS

(75) Inventors: Amory Joseph Gage, Richmond, VT (US); Hossein Ghafouri Kia, Alpharetta, GA (US); Nerino Dennis Mayer, Alpharetta, GA (US)

(73) Assignee: MP Platforms, LLC, South Burlington, VT (US)

( * ) Notice: Subject to any disclaimer, the term of this patent is extended or adjusted under 35 U.S.C. 154(b) by 0 days.

(21) Appl. No.: 13/478,726

(22) Filed: May 23, 2012

(51) Int. Cl.
*G06Q 40/00* (2012.01)

(52) U.S. Cl.
USPC .............................. 705/40; 705/35

(58) Field of Classification Search
USPC .................................... 705/40, 35
See application file for complete search history.

(56) References Cited

U.S. PATENT DOCUMENTS

| | | | |
|---|---|---|---|
| 6,397,198 B1 * | 5/2002 | Hoffman et al. | 705/44 |
| 2004/0254896 A1 * | 12/2004 | Barsade et al. | 705/400 |
| 2006/0224508 A1 * | 10/2006 | Fietz | 705/40 |
| 2007/0220595 A1 * | 9/2007 | M'raihi et al. | 726/5 |
| 2010/0257067 A1 * | 10/2010 | Chan | 705/21 |

OTHER PUBLICATIONS

Political Transcript Wire; "U.S. Senator Richard Shelby (R-AL) holds a hearing on child pornography"; Sep. 21, 2006.*
Targeted News Service; "U.S. Patents Awarded to Inventors in Pennsylvania"; Oct. 14, 2010.*

* cited by examiner

*Primary Examiner* — Edward Chang
(74) *Attorney, Agent, or Firm* — Stamoulis & Weinblatt LLC (57) ABSTRACT

In an implementation, a transaction request message is received at a computing device, wherein the transaction request message is associated with a merchant. Profile information associated with the merchant is retrieved by the computing device. Based in part on the retrieved profile information associated with the merchant or the transaction request message, third-party service providers associated with the transaction request message are determined by the computing device. Profile information associated with the determined third-party service providers is retrieved by the computing device. Based in part on the retrieved profile information associated with the merchant, the retrieved profile information associated with the determined third-party service providers, or the transaction request message, a formatted transaction request message is generated from the transaction request message by the computing device. The formatted transaction request messages may be provided to the determined third-party service providers by the computing device simultaneously or in the future.

14 Claims, 5 Drawing Sheets

SYSTEMS AND METHODS FOR INTERFACING MERCHANTS WITH THIRD-PARTY SERVICE PROVIDERS

BACKGROUND

Merchants, such as retailers, may use multiple services provided by third-party service providers. These services may include credit card processing services, inventory services, customer loyalty program services, fraud prevention services, security services and employee time, payroll services, billing services, reporting services, and commission tracking services.

While such third-party services are useful, there may be several drawbacks associated with such systems. First, each third-party service may provide different methods or means to the merchant for accessing the service. For example, one third-party service provider may require the merchant to access the service using a web browser, another third-party service provider may require the merchant to access the service by providing a file of a particular format, and another third-party service provider may require the merchant to use a specialized device to access the service. Thus, interacting with such third-party services may require many separate transactions and/or steps by the merchant.

Second, merchants often accept payment from purchasers using a variety of modern and legacy retail processing systems such as point-of-sale devices and electronic cash registers. Some of these systems may not be supported or well-integrated with respect to each third-party service provider, forcing the merchant to purchase new processing systems. Moreover, because of the variety of retail processing systems being used, third-party service providers may not be able to provide assistance to a merchant in the event that a transaction cannot be completed.

SUMMARY

In an implementation, a transaction request message is received at a computing device, wherein the transaction request message is associated with a merchant. Profile information associated with the merchant is retrieved by the computing device. Based in part on the retrieved profile information associated with the merchant or the transaction request message, a third-party service provider associated with the transaction request message is determined by the computing device. Profile information associated with the determined third-party service provider is retrieved by the computing device. Based in part on the retrieved profile information associated with the merchant, the retrieved profile information associated with the determined third-party service provider, or the transaction request message, a formatted transaction request message is generated from the transaction request message by the computing device. The formatted transaction request message is provided to the determined third-party service provider by the computing device.

Implementations may include some or all of the following features. A response from the third-party service provider may be received indicating that a transaction associated with the formatted transaction request message was completed. A response to the received transaction request message may be generated based on a received response from the third-party service provider. The transaction request message may have been received from a merchant device. The generated response to the received transaction request message may be provided to the merchant device. The transaction request message may be a request to process a payment. The transaction request message may be one or more of a payroll request, an inventory request, a security or fraud related request, a tax collection or reporting request, an alert or notification request, a lease or rental fee collection or remittance request, and a membership fee collection or remittance request. Determining a third-party service provider associated with the transaction request message may include determining a plurality of third-party service providers associated with the transaction request message, retrieving profile information associated with the determined third-party service provider may include retrieving profile information associated with each of the plurality of determined third-party service providers, and generating a formatted transaction request message from the transaction request message may include generating a formatted transaction request message for each of the plurality of third-party service providers.

The plurality of third-party service providers may include an inventory service provider and a payment processing service provider. Generating a formatted transaction request message for each of the plurality of third-party service providers may include generating a formatted transaction request message for the inventory service provider, and generating a formatted transaction request message for the payment processing service provider. The plurality of third-party service providers may include a tax service provider, and generating a formatted transaction request message for each of the plurality of third-party service providers may include generating a formatted transaction request message for the tax service provider. The plurality of third-party service providers may include a customer loyalty service provider, and generating a formatted transaction request message for each of the plurality of third-party service providers may include generating a formatted transaction request message for the customer loyalty service provider.

In an implementation, a first request message is received at a computing device from a retail processing system. A device identifier is retrieved by the computing device. The device identifier may uniquely identify the computing device to an interface system. A second request message is generated from the first request message in a format specified by the interface system by the computing device. The device identifier is included in the generated second request message by the computing device. The generated second request message is provided to the interface system by the computing device.

Implementations may include some or all of the following features. The device identifier may be received by the interface system. The retail processing system may be one of an electronic cash register, a point of sale terminal, a customer activated system, a mobile point of sale terminal, or an Internet based system. A request for status information may be transmitted from the interface system, and status information may be provided to the interface system in response to the request. The status information may include one or more of an operating temperature, power supply related information, and indicators of networking conditions.

The first request message may include a request to process a payment. A response to the second request message may be received. The response may indicate that the payment was processed. A response to the first request message may be generated based on the received response to the second request message and a format specified by the retail processing system. The response to the retail processing system may be provided. The device identifier may be associated with a merchant. Either or both the generated first request message or second request message may be encrypted.

In an implementation, a system includes a merchant device and an interface system. The merchant device is adapted to receive a transaction request message from a retail processing system, retrieve a device identifier, wherein the device identifier uniquely identifies the merchant device, append the device identifier to the transaction request message, and provide the transaction request message to an interface system. The interface system is adapted to receive the transaction request message, retrieve profile information associated with a merchant using the appended device identifier, based in part on the retrieved profile information associated with the merchant or the transaction request message, determine a third-party service provider associated with the transaction request message, retrieve profile information associated with the determined third-party service provider, based in part on the retrieved profile information associated with the merchant, the retrieved profile information associated with the determined third-party service provider, or the transaction request message, generate a formatted transaction request message from the request message, and provide the formatted transaction request message to the determined third-party service provider.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
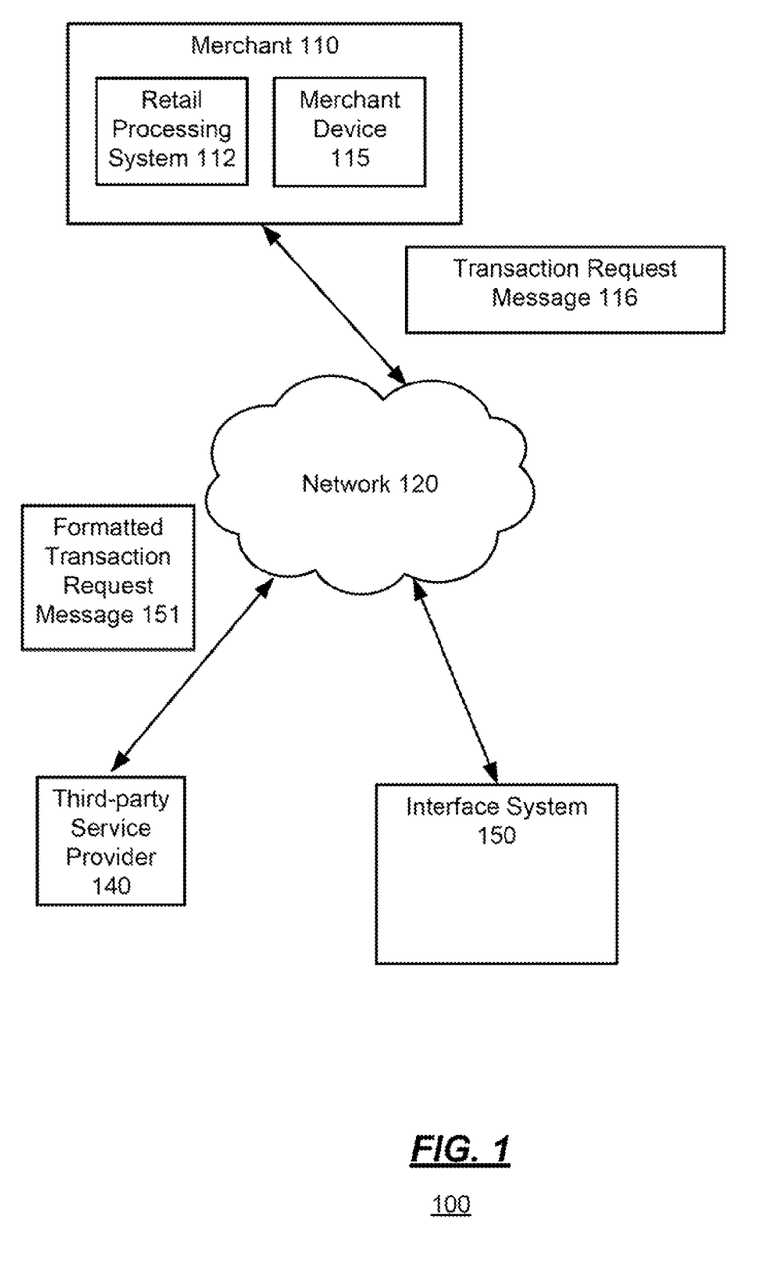
FIG. 1 is a block diagram of an environment for enabling data processing between retail processing systems and one or more third-party service providers.

FIG. 1 is a block diagram of an environment 100 for enabling data processing between retail processing systems and one or more third-party service providers. The environment 100 includes one or more merchants 110 and one or more third-party service providers 140. The third-party service providers 140 may provide one or more data processing services through a network 120. The network 120 may be a variety of network types including the public switched telephone network (PSTN), a cellular telephone network, a dedicated system-to-system link and a packet switched network (e.g., the Internet).

The services provided by the third-party service providers 140 may include financial transaction processing services, payment processing services, data aggregation services, management services, inventory services, accounting services, reporting and storage services, payroll processing services, fraud prevention services, reporting services, customer loyalty services, and federal, state and local tax services. Other services may be provided. A merchant 110, as used herein, may be any party that uses a service, either directly or indirectly, provided by a third-party service provider 140. Merchants 110 may include, but are not limited to, retailers, vending machines, fuel pumps, customer self-activated retail systems, and web sites, for example.

Each merchant 110 may include a retail processing system 112. The retail processing systems 112 may be used to facilitate the purchase of goods and services made available by the merchants 110. In addition, retail processing systems 112 may be used to facilitate inventory, accounting, tax, coupon and customer loyalty related processes for the merchants 110. Examples of retail processing systems may include electronic cash registers, personal computers, customer activated terminals (e.g., vending machines, and self-checkout machines), point-of-sale systems, fuel pumps, mobile point-of-sale systems, Internet-based ecommerce systems, and mobile commerce systems (e.g., smart-phones, and tablet computers). Other types of retail processing systems 112 may be supported.

A merchant 110 may desire to use the services provided by the third-party service providers 140. As may be appreciated, there may be a large number of third-party service providers 140, with each third-party service provider 140 using a different set of protocols and/or data formats. Thus, interacting with each of the third-party service providers 140 may involve the merchant 110 generating multiple transaction messages in different formats for a single customer transaction. Moreover, many merchants 110 may use legacy retail processing systems 112 that may not support the particular formats and/or protocols and/or network types used by the third-party service providers 140.

Accordingly, the environment 100 may further include an interface system 150. The interface system 150 may receive a transaction request message 116 from a merchant 110. The transaction request message 116 may be generated by the retail processing system 112 and may include an identifier of the merchant 110. The identifier of the merchant 110 may be an explicit identifier of the merchant 110, or may be an indirect identifier of the merchant such as a device identifier that the interface system 150 may then use to identify the merchant 110. For example, the transaction request message 116 may be a request to process a credit card transaction.

The interface system 150 may receive the transaction request message 116, and may determine or retrieve a merchant profile associated with the merchant 110 that originated the request message 116. The merchant profile may be associated with a merchant 110, and may include various information about the merchant 110, including, but not limited to, identifiers of the third-party service providers 140 that the merchant 110 does business with, and identifiers of the data format(s) supported by the retail processing system 112 associated with the merchant 110. In some implementations, the merchant profile may be determined based on information associated with the merchant 110 or provided by the merchant 110.

The interface system 150 may use one or more of the retrieved merchant profile, the transaction request message 116, or the merchant 110 identifier to determine an identifier of a third-party service provider 140 that may fulfill the request associated with transaction request message 116. The interface system 150 may then generate a formatted transaction request message 151 based on the transaction request message 116 and a format used by the determined third-party service provider 140, and may provide the formatted request message 151 to the identified third-party service provider 140.

The interface system 150 may receive a response from the identified third-party service provider 140, and may generate a response to the transaction request message 116 based on the received response from the identified third-party service provider 140. For example, the interface system 150 may determine a message format or protocol supported by the retail processing system 112 of the merchant 110, and may generate a response message using the determined message format or protocol.

In some implementations, rather than just generate a single formatted transaction request message 151 based on the received transaction request message 116, the interface system 150, based on information in the merchant profile or otherwise associated with the merchant 110 identifier, may generate multiple formatted transaction request messages 151 for multiple third-party service providers 140. For example, a merchant 110 may specify that when a credit card purchase is made at the retail processing system 112 that multiple services be invoked including an inventory management service, a tax service, a customer loyalty service, a report service, and an employee commission service.

Accordingly, when the interface system 150 receives a transaction request message 116 to process a credit card purchase, the interface system 150 may generate multiple formatted transaction request messages 151 based on each of the desired services. Continuing the example above, the messages 151 may include a message 151 for an inventory service provider indicating the item that was purchased, a message 151 to a tax service provider with an indication of the sales tax that was collected, a message 151 to a customer loyalty service provider to credit a loyalty account of the purchaser of the item, and a message 151 to an employee commission service to credit a commission account associated with the employee who sold the item.

In some implementations, rather than, or in addition to, generating the formatted transaction request messages 151, the interface system 150 may store indicators of one or more actions to perform, or transaction request messages 151 to send. The messages or actions associated with the stored indicators may then be later sent or performed by the interface system 150. Continuing the example above, rather than generate the message 151 to the tax service provider at the same time that the credit card purchase is processed, the interface system 150 may add or store an indicator to generate a message 151 to the tax service provider with an indicator of the sales tax that is collected. Then, at a scheduled date the interface system 150 may retrieve all of the stored indicators related to the tax service provider and may generate a single batch message 151 to the tax service provider that includes all of the tax related information for the merchant 110.

Figure 5:
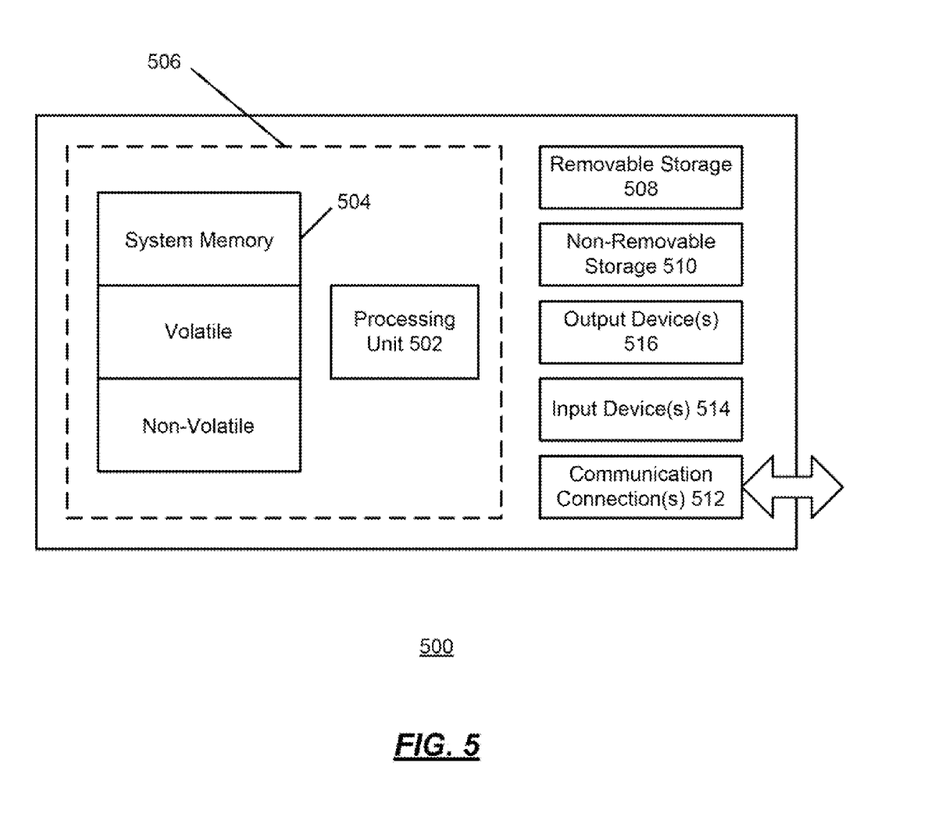
FIG. 5 shows an exemplary computing environment.

The interface system 150 may be implemented using a general purpose computing device such as the computing system 500 illustrated in FIG. 5. The interface system may include one or more CPUs and may include a multi-threaded operating system. In some implementations, the interface system 150 may isolate data communication and protocol handling from core processing functionality in order to provide rapid and reliable services to the merchants 110 and/or third-party service providers 140.

In some implementations, one or more of the merchants 110 may further include what is referred to herein as a merchant device 115. The merchant device 115 may be a specialized device that is provided to a merchant 110 by the interface system 150 for connecting and interfacing with a variety of retail processing systems 112. Alternatively, the merchant device 115 may be a virtual device or software that is executed by one or more merchant computing systems, or may be part of an online store. The merchant device 110 may receive transaction requests from the retail processing systems 112, and may append and provide the received requests to the interface system 150 as or to one or more transaction request messaged 116. In some implementations, the merchant device 110 may format the received requests in a format used or specified by the interface system 150. The merchant device 115 may then provide the transaction request messages 116 to the interface system 150. The merchant device 110 may be implemented using a general purpose computing device such as the computing system 500 illustrated with respect to FIG. 5. Alternatively, or additionally, the merchant device 110 may be implemented using a specialized computing device which may include more or fewer components than those shown with respect to the computing system 500.

The merchant device 115 may further append a device identifier to the transaction request message 116. The interface system 150 may then use the device identifier to determine the merchant 110 associated with the transaction request message 116. In addition, in some implementations, messages between the merchant device 115 and the interface system 150 may be encrypted and optimized for performance improvements, and/or compressed using various techniques for speed improvements and to minimize data usage on the telecommunications network between the merchant device 115 and the interface system 150.

In some implementations, the merchant device 110 may receive transaction requests from a plurality of retail processing systems 112. The merchant device 110 may act similarly as a router in that it may receive the transaction requests and may provide the received request to the interface system through a single network connection. In addition, the merchant device 110 may multi-thread the transaction requests received from the plurality of retail processing systems such that the retail processing systems 112 may execute a plurality of customer transactions without having to wait for another transaction to complete.

While in some implementations the interface system 150 may receive transaction request messages 116 directly from retail processing systems 112, the use of merchant devices 115 may provide several advantages. One such advantage is that legacy retail processing systems 112 may not communicate with the network 120. For example, many retail processing systems 112 may lack the ability to communicate using a format or protocol that is acceptable to the interface system 150 or to a third-party service provider 140. The merchant device 115 may support a variety of formats and/or protocols used by retail processing systems 112, and may convert data sent between a retail processing system 112 and the interface system 150.

In addition, the merchant device 115 may allow the legacy retail processing systems 112 to communicate with the network 120 using a technology that is not supported by the legacy retail processing systems 112. For example, the merchant device 115 may allow a legacy retail processing system 112 to communicate using cellular or wireless communication technologies. In some environments, such alternative communications technologies may offer the only viable communication solution, or a superior solution to what would otherwise be available to the legacy retail processing system 112.

Another advantage is that the merchant device 115 may be adapted to provide failover protection to the merchant 110. For example, the merchant device 115 may be adapted to automatically use other communication means to communicate with the interface 150 in the event of a network 120 failure. The other communication means may include a cellular network, for example. In some implementations, the merchant 110 or the interface system 150 may specify a preferred set of secondary communication means for the merchant device 115 to use in case of a failure of a primary network.

Another advantage is that the merchant device 115 may allow for diagnostic or troubleshooting services to be provided to the merchant 110. For example, the interface system 150 may periodically ping or check the status of the merchant devices 115, and may alert the merchants 110 to any detected problems. In addition, updates or other software changes may be pushed to merchant devices 115 by the interface system 150. Further, the merchant device 115 may, upon request, provide status information to the interface system 150. The status information may include information about the health of the network 120, the health of one or more retail processing systems 112, an operating temperature of the merchant device 115, and a status of a power supply associated with the merchant device 115.

Another advantage is that networking or other communication services may be provided to merchants 110 along with the device 115. For example, an entity associated with the interface system 150 may sell or make available network or other communications services to merchants 110 that include the merchant device 115. These services may be provided to merchants 110 at a price that is lower than they are able to negotiate from their local telecommunications provider, or the network services may be bundled along with the services provided by the interface system 150.

Figure 2:
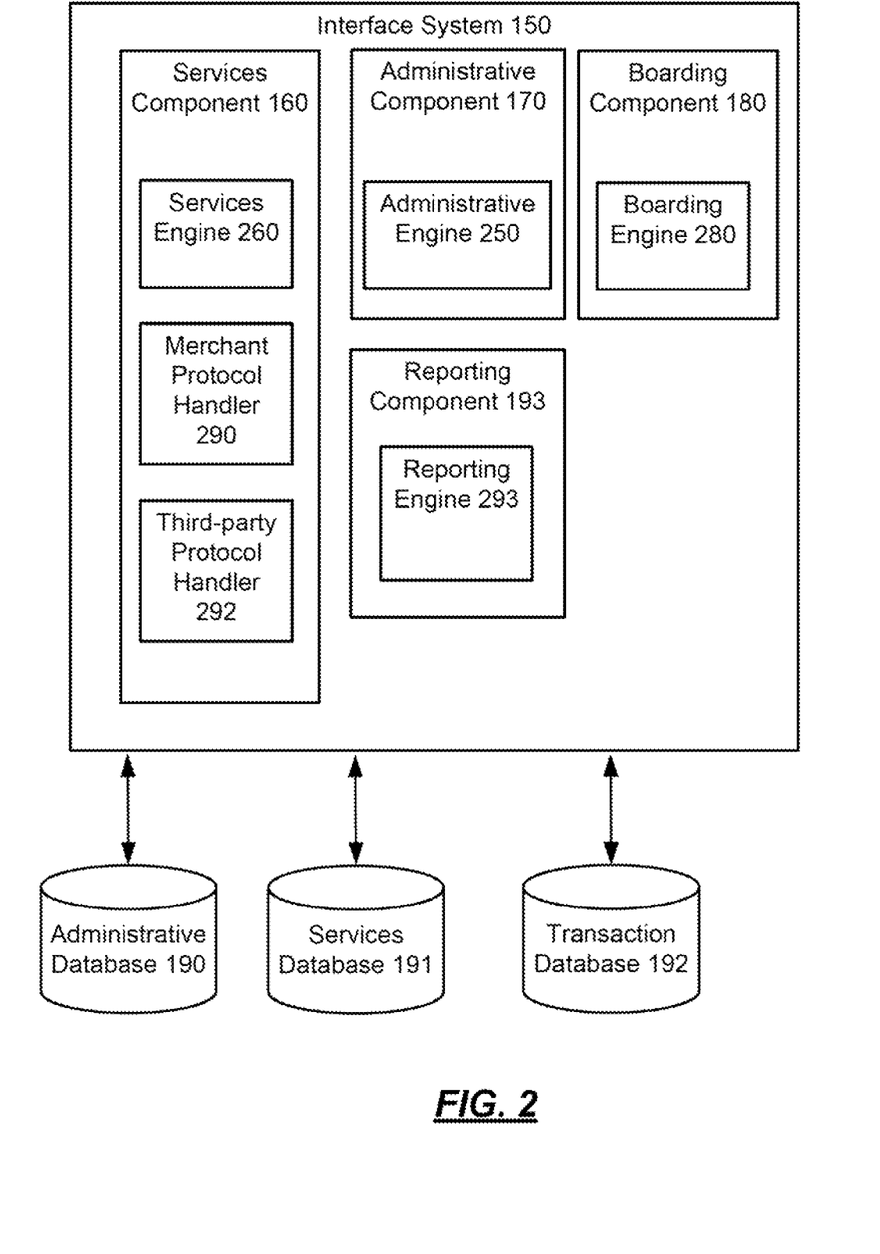
FIG. 2 is a block diagram of an implementation of an interface system.

FIG. 2 is an illustration of an example interface system 150. As shown, the interface system 150 includes several components such as a services component 160, an administrative component 170, a boarding component 180, and a reporting component 193. More or fewer components may be supported. In addition, some or all of the components of the interface system 150 may access and/or store data using one or more of administrative database 190, a services database 191, and a transaction database 192. While shown as either being within or separate from the interface system 150, each of the components and/or databases described herein may be implemented together or independently on one or more computing systems or data storage devices.

The administrative component 170 may include an administrative engine 250 that provides an interface for the merchants 110, third-party service providers 140, or an administrator or operator associated with the associated with the interface system 150. The interface may be used to create accounts and/or profiles on the system 150. The interface may be further used to configure, from time to time, different third party services that the merchants 110 might use, different corporate hierarchies for reporting functions associated with the merchants 110 or service providers 140, and the configuration or specification of different communication or network technologies, for example.

Each merchant 110 may have an associated merchant profile on the interface system and each third-party service provider 140 may have an associated service provider profile. In some implementations, the administrative component 170 may provide a web based interface that users associated with the third-party service providers 140, merchants 110, or the interface system 150 may use to set up accounts. Alternatively, or additionally, the third-party service providers 140, merchants 110, or interface system 150 administrator may provide the information in a file or other data structure. The administrative engine 250 may then use the provided information to generate a profile for the third-party service provider 140 and/or merchant 110, and the profile may be stored by the administrative engine 250 in the administrative database 190 and/or services database 191.

With respect to the merchants 110, when a merchant 110, third-party service provider 140 or interface system 150 administrator sets up an account with the interface system 150, the administrative engine 250 may create a merchant profile for the merchant 110. In some implementations, the merchant profile may include a unique merchant identifier that identifies the merchant 110. The merchant profile may include one or more device identifiers that identify any merchant devices 115 used by the merchant 110, as well as any retail processing systems 112 used by the merchant 110.

The merchant profile may further include identifiers of any accounts or relationships that the merchant 110 has with third-party service providers 140. The identifiers may also have associated access information that may be used to access the identified accounts such as user names, passwords, or other authentication information. In some implementations, the access information may include indicators of protocols or data formats used by each third-party service provider 140 as well as other indicators concerning attributes of the third-party services.

In some implementations, the merchant profile may further include identifiers of actions that the merchant 110, third-party service provider 140, or interface system 150 administrator would like performed when a particular type of transaction message 116 is received by the interface system 150. In particular, the number and types of formatted transaction request messages 151 that are generated for each type of transaction request message 116 may be specified. For example, the merchant 110, third-party service provider 140, or interface system 150 administrator may specify to the administrative engine 250 that when a transaction message 116 that is a request to process a financial transaction related to the purchase of an item is received, that a formatted transaction request message 151 is generated for a credit card processing service provider 140 to process the purchase, as well as a formatted transaction request message 151 for an inventory processing service provider 140 to account for the sale of the item. Other messages 151 may also be generated. In addition, whether any indicators of actions should be stored for later performance by the interface system 150 may be specified.

In some implementations, a merchant 110, third-party service provider 140, or interface system 150 administrator may further use the administrative engine 250 to provide various configuration or programming data associated with the retail processing system 112 or merchant device 115 that may be used by the retail processing system 112, the interface system 150 and/or the third-party service providers 140 to provide one or more services to the merchant 110. For example, the configuration or programming data may include inventory data such as item or PLU numbers, items descriptions, item price information, discount information, and taxability information. The configuration or programming data may further include tax tables, and keyboard configuration information. In some implementations, the configuration or programming data may be extracted by the interface system 150 from one or more retail processing systems 112. The extracted configuration or programming data may then be provided to other systems 112, stored, or provided to merchants 110, third-party service providers 140, or interface system 150 administrators for manipulation.

With respect to the third-party service providers 140, when a third-party service provider 140 sets up an account with the interface system 150, the administrative engine 250 may create a service provider profile for the service provider 140. In some implementations, the service provider profile may include a unique service provider identifier that identifies the service provider 140. The service provider 140 may provide an indicator of a format or protocol that the interface system 150 may use to provide formatted transaction request messages 116 to the service provider 140. The account associated with the third-party service provider 140 may be created by the interface system 150 administrator, for example.

In some implementations, the service provider profile may further include identifiers of the merchants 110 that have accounts or relationships with the third-party service provider 140 associated with the profile. Other information also may be included in the service provider profile.

The administrative engine 250 may further handle and track the assignment of device identifiers to merchant devices 115, and may associate merchant identifiers with device identifiers. The device identifiers may be associated with each merchant device 110 when it is manufactured, or alternatively, the administrative engine 250 may assign a device identifier 110 dynamically, before or after it is deployed to a merchant 110.

The services component 160 may handle transaction request messages 116 from the merchants 110 to one or more of the third-party service providers 140. In some implementations, the services component 160 may include a services engine 260, a merchant protocol handler 290, and a third-party protocol handler 292. More or fewer components may be supported. The services component 160 may use and store data from the services database 191.

The services engine 260 may be a transaction processing engine that is capable of simultaneously processing multiple transaction request messages 116 received from a plurality of merchants 110 and/or a plurality of retail processing systems 112 within a single merchant 110 or within a plurality of merchants 110. The services engine 260 may further generate and route one or more formatted transaction request messages 151 to one or more third-party service providers 140. The services engine 260 may further periodically perform one or more actions that have been stored or queued for later processing in response to one or more transaction request messages 116. The actions may be stored or queued in the services database 191 and/or transaction database 192. For example, the services engine 260 may store or queue certain actions for processing at the end of the month, week, or year. The services engine 260 may log or keep records of processed transactions and/or actions in the services database 191 and/or transaction database 192.

The merchant protocol handler 290 may translate or reformat transaction request messages 116 received from one or more merchant devices 115 and or retail processing systems 112 into a format that is understandable by the services engine 260. In some implementations, when a transaction request message 116 is received by the interface system 150, the merchant protocol handler 290 may determine the merchant identifier or device identifier associated with the message 116. The merchant protocol handler 290 may then locate a merchant profile associated with the determined merchant identifier or device identifier, and may determine the format and/or protocol used by the merchant 110. The merchant protocol handler 290 may then translate the transaction request message 116 into a format recognized by the services engine 260 and may provide the translated message to the services engine 260 for processing.

The merchant protocol handler 290 may further translate or reformat messages before they are sent to a merchant 110 into a format used by a retail processing system 112 or a merchant device 115 at the merchant 110. In some implementations, the services engine 260 may generate a response to a received transaction request message 116 from a merchant 110 that indicates that the transaction was successful processed by a third-party service provider 140. If the transaction could not be processed (e.g., because an error occurred which prevented the message from being transmitted to or from the third party service provider 140, or that the third party service provider 140 returned an error message to be returned to the retail processing system 112) the services engine 260 may generate and provide an error message to the merchant 110. Before the response is sent to the merchant 110, the merchant protocol handler 290 may format the response according to a format and/or protocol used by the merchant 110 as indicated by the merchant profile. The services engine 260 may then send the formatted response to the merchant 110.

The third-party protocol handler 292 may generate formatted transaction request messages 151 based on messages generated by the services engine 260 into a format or protocol that is understandable by the third-party service providers 140. In some implementations, when a message is received from the service engine 280 for a third-party service provider 140, the third-party protocol handler 292 may determine the service provider identifier of the third-party service provider 140 that is to receive the message. The third-party protocol handler 292 may then locate a service provider profile associated with the determined service provider identifier, and may determine the format and/or protocol used by the third-party service provider 140. The third-party protocol handler 292 may then generate the formatted transaction request message 151 according to the determined format and may provide the message 151 to the third-party provider 140.

The third-party protocol handler 292 may further translate or reformat messages received from the third-party service providers 140 into a format used by the services engine 260. In some implementations, when a response to a formatted transaction request message 151 is received from a third-party service provider 140, the third-party protocol handler 292 may determine the format used by the third-party service provider 140 using the service provider profile for the provider 140. The third-party protocol handler 292 may then format the response based on the determined format. The formatted response may then be provided to the services engine 260 for processing.

The services engine 260 may further determine one or more actions to perform for a merchant 110 when a transaction request message 116 is received from a merchant 110. The actions may include generating one or more transaction request messages 151, or storing indicators of one or more actions or transaction request messages 151 to be later performed and/or sent. The indicators of actions of transaction request messages to be later performed may be stored in the services database 191 and/or the transaction database 192.

As described above, when a transaction request message 116 is received, the interface system 150 may automatically generate a plurality of formatted transaction request messages 151 for each of a plurality of third-party service providers 140, or may store an indicator of an action or message 151 to perform or send at a later time. Thus, when a transaction request message 116 is received from a merchant 110, the services engine 260 may determine one or more actions associated with the type of message 116 using the merchant profile associated with the merchant 110, and may perform the one or more determined actions (e.g., may generate a plurality of formatted transaction request messages), or may store indicators of the actions to performed later in the services database 191 and/or the transaction database 192.

The services engine 260, when necessary, may use portions of the configuration data provided by a merchant 110 (or third-party service provider 140 and/or interface system 150 administrator) to generate the formatted transaction request messages 151. For example, when the interface system 150 receives a transaction request message 116 that is a request to process a credit card purchase, the services engine 260 may automatically generate a formatted transaction request message 151 to a credit card processing service provider 140, as well as messages 151 to inventory and tax services providers 140. Because the tax and inventory service providers 140 may require information that is not part of the original transaction request message 116, the services engine 260 may use the programming data related to inventory and taxes that was previously provided by the merchant 110 (or other source) to generate the messages 151 to the tax and inventory services.

The services engine 260 may further provide access to a variety of other services to merchants 110. For example, the services engine 260 may provide access to inventory, payroll, and other data services that may be of interest to merchants 110. The services engine 260 may provide the information based on the programming data provided by the merchants 110, and based on records of the transaction request messages 116 and other actions processed by the services engine 260. The services provided by the services engine 260 may include any services that may be used by a merchant 110.

The boarding component 180 may manage the configuration and transfer of data between the administrative database 190, the services database 191, and the transaction database 192. In some implementations, when a merchant 110, third-party service provider 140, or interface system 150 administrator creates a merchant profile or a service provider profile in the administrative database, a boarding engine 280 of the boarding component 180 may import the created profile from the administrative database 190 to the services database 191. In addition, the boarding engine 280 may monitor the administrative database 190 for any changes made to any of the stored profiles, and may make corresponding changes to the corresponding profiles in the services database 191. The boarding engine 280 may continuously monitor the administrative database 190 for changes, or may periodically check the administrative database 190 for changes at scheduled times, or at the request of a user or administrator.

Similarly, the boarding engine 280 may import data related to services to be performed on behalf of merchants 110 by the services engine 260 from the administrative database 191 to the services database 192. The boarding engine 290 may continuously monitor the administrative database 191 for new information, or may periodically check the administrative database 191 for new information at scheduled times, or at the request of a user or administrator.

The reporting component 193 may generate reports for the merchants 110 and/or the third-party service providers 140 based on the transactions indicated in the transaction database 192. The reporting component 193 may include a reporting engine 293 that provides an interface, such as a webpage, through which a merchant 110 and/or a third-party service provider may provide one or more report parameters to the reporting engine 30. The reporting engine 293 may use the transactions from the transaction database 192 and/or configuration information from the services database 191 to generate one or more reports based on the report parameters. The report parameters may include transaction dates, transaction types, completed or pending transactions, transactions that were not completed, transaction size, and third-party service providers 140 associated with the transactions, for example. Other parameters may also be supported.

For example, a merchant 110 may desire to see a report of all transactions performed by the interface system 150 on behalf of the merchant 110 for a particular month for a specific third-party service provider 140. Accordingly, the merchant 110 may use a web interface provided by the reporting engine 293 to select a report corresponding to the desired month and service provider 140. The reporting engine 293 may then retrieve all transactions associated with the merchant 110 and the selected service provider 140 in the transactions database 192 for the desired month, and may generate a report based on the retrieved transactions. The reporting engine 293 may then provide the generated report to the merchant 110 through the web interface, email, or other communication means.

Figure 3:
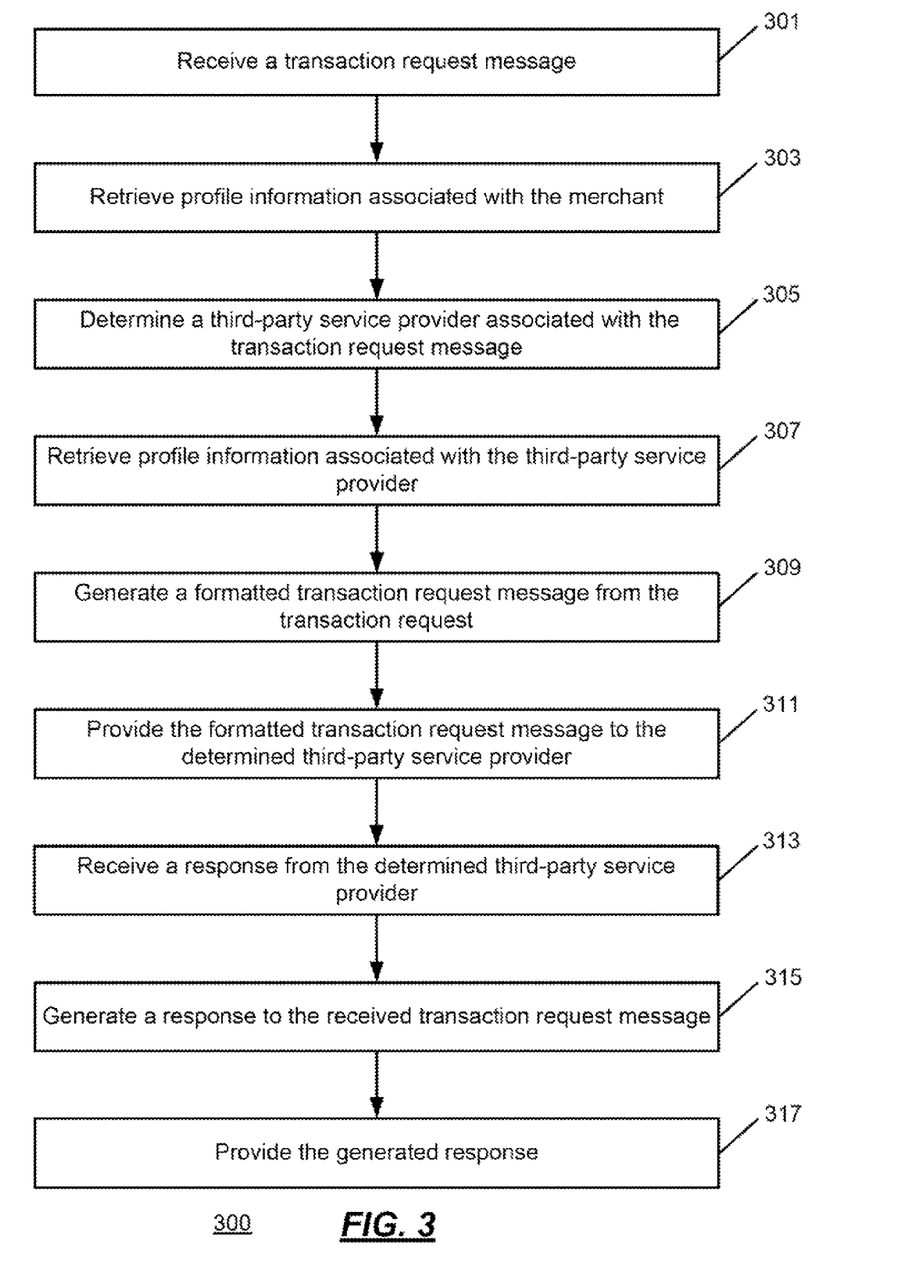
FIG. 3 is an operational flow of an implementation of a method for providing transaction request messages to one or more third-party service providers.

FIG. 3 is an operational flow of an implementation of a method 300 for providing transaction request messages to one or more third-party service providers 140. The method 300 may be implemented by an interface system 150.

A transaction request message is received at 301. The transaction request message 116 may be received by the interface system 140 from a merchant 110. In some implementations, the transaction request message 116 may be received from a merchant device 115 associated with the merchant 110. Alternatively, the transaction request message 116 may be received from a retail processing system 112 associated with the merchant 110. The transaction request message 116 may be associated with a merchant identifier or a device identifier. The transaction request message 116 may be encrypted and optimized using various techniques for speed and bandwidth performance in the telecommunications network.

The transaction request message 116 may be a request for a service provided by one or more third-party service providers 140. For example, the request may be one or more of a payroll request, an inventory request, a security or fraud related request, a lax collection or reporting request, an alert or notification request, a lease or rental fee collection or remittance request, and a membership fee collection or remittance request. Other services also may be requested.

Profile information associated with the merchant is retrieved at 303. The profile information may be retrieved by the interface system 150 from the services database 191. The profile information may be a merchant profile, and may be retrieved from the services database 191 based on the merchant identifier or device identifier provided with the received transaction request message 116.

A third-party service provider associated with the transaction request message is determined at 305. The third-party service provider may be determined by the interface system 150 based in part on the retrieved profile information associated with the merchant or the transaction request message 116. For example, the third-party-service provider 140 may be identified in the transaction request message 116, or may be listed in the merchant profile.

Profile information associated with the third-party service provider is retrieved at 307. The profile information may be retrieved by the interface system 150 from the services database 191. The profile information may be the service profile.

A formatted transaction request message 151 is generated from the transaction request at 309. The formatted transaction request message 151 may be generated based in part on the retrieved profile information associated with the merchant 110, the retrieved profile information associated with the determined third-party service provider 140, or the transaction request message 116. The formatted transaction request message 151 may be a request to process a financial transaction. The formatted transaction request message 151 may be encrypted and/or compressed.

In some implementations, rather than generate a single formatted transaction request message 151, the interface system 150 may generate a plurality of formatted transaction request messages 151 according to instructions included in the merchant profile. For example, where the transaction request message 116 was a request to process a payment for a purchase of an item, the interface system may generate a formatted transaction request message 151 for an inventory service provider that removes the item from an inventory, a formatted transaction request message 151 for a payment processing service provider to process a credit card transaction associated with the item, and a formatted transaction request message 151 for a tax service provider that credits a tax account with an amount of sales tax included in the purchase of the item. The received transaction request message 116 may have included inventory information, payment information, and tax information that was used by the interface system 150 to generate the plurality of third-party service provider 140 messages. Alternatively, the formatted transaction request messages 151 may use tax or inventory information from programming data associated with the merchant 110.

Alternatively, or additionally, rather than generate one or more transaction messages 151, the interface system 150 may store an indicator of an action or transaction in the services database to be later performed based on the transaction request message. The interface system 150 may then perform the indicated action or transaction at a later date. For example, rather than perform tax or other less time sensitive transactions immediately, the interface system 150 may perform the stored indicated transactions at a later time (e.g., monthly, weekly, or at a time of low interface system 150 usage). In addition, the interface system 150 may bundle or batch one or more of the stored transaction requests or actions into one or more transaction request messages 151.

The formatted transaction request is provided to the determined third-party service provider at 311. The formatted transaction request 151 may be provided to the determined third-party service provider 140 by the interface system 150. Where multiple formatted transaction request messages 151 are generated by the interface system 150, each of the generated messages 151 may be provided to their associated third-party service provider 140 by the interface system 150.

A response from the determined third-party service provider is received at 313. The response from the determined third-party service provider 140 may be received by the interface system 150 and may indicate that the third-party service provider 140 successfully or unsuccessfully completed a transaction associated with the received transaction request message 116. In implementations where multiple formatted transaction request messages 151 were generated, multiple responses may be received by the interface system 150. Any of the response messages may be encrypted and/or compressed.

A response to the received transaction request message is generated at 315. The response to the received transaction request may be generated by the interface system 150 based on the received response from the third-party service provider 140. The response may be generated by the interface system 150 using a format or protocol used by the merchant device 115 or retail processing system 112 associated with the merchant 110. The format or protocol may be determined by the interface system 150 from the merchant profile associated with the merchant 110.

In implementations where multiple responses were received by the interface system 150, multiple responses to the received transaction requests may be generated by the interface system 150. Alternatively, a single response to the received transaction request may be generated that encompasses information from some of all of the multiple responses may be generated by the interface system 150. Any or all of the response messages may be encrypted and/or compressed.

The generated response is provided at 317. The generated response may be provided to the merchant 110 by the interface system 150. Depending on the implementation, the generated response may be provided to a retail processing system 112 or a merchant device 115 associated with the merchant 110.

Figure 4:
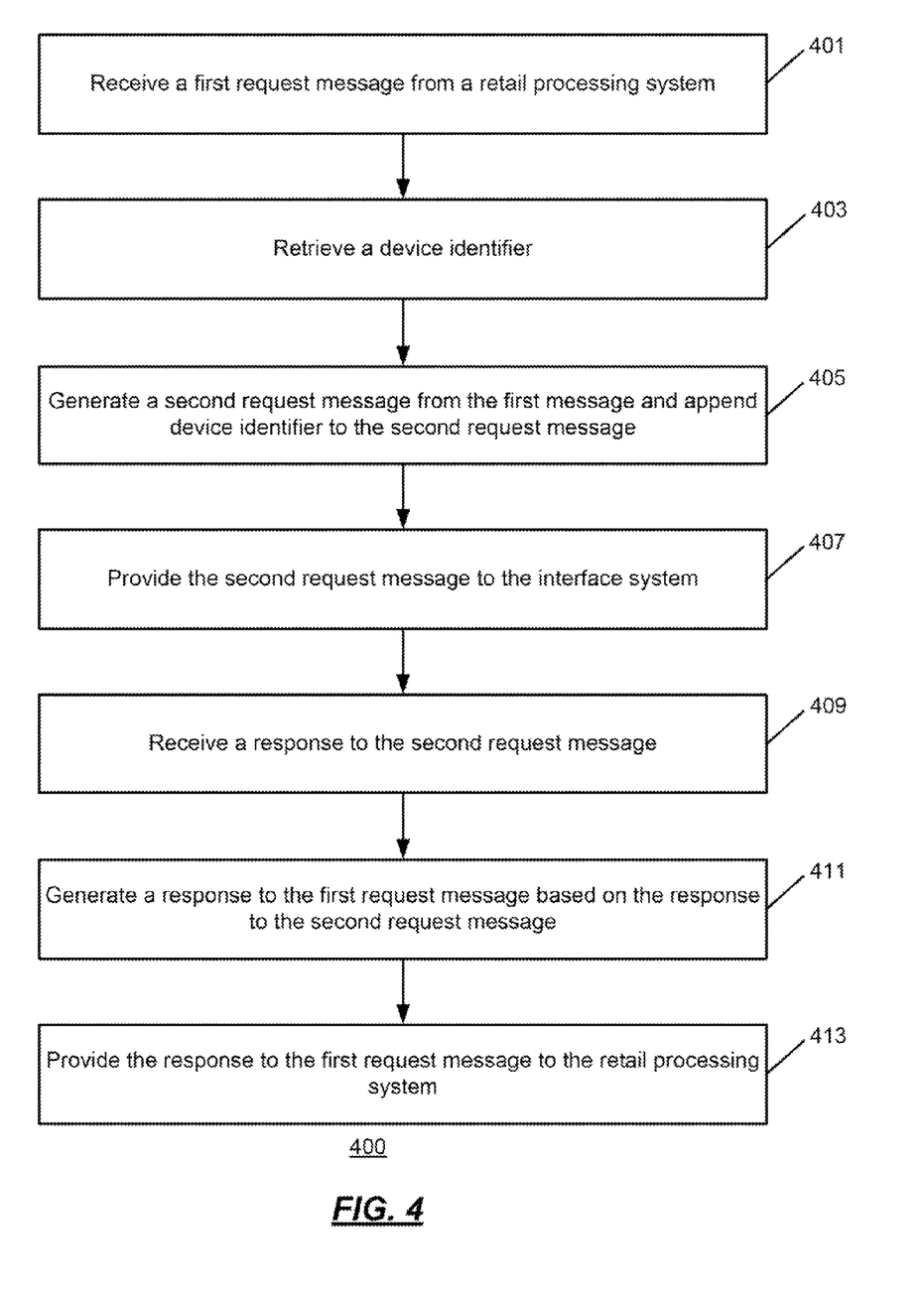
FIG. 4 is an operational flow of an implementation of a method for providing transaction request messages from retail processing systems to an interface system.

FIG. 4 is an operational flow of an implementation of a method 400 for providing transaction request messages from retail processing systems to an interface system. The method 400 may be implemented by a merchant device 115 of a merchant 110.

A first request message is received from a retail processing system at 401. The first request message may be received by the merchant device 115 from the retail processing system 112. The merchant device 115 and the retail processing system 112 may both be associated with a merchant 110. The first request message may be a request to perform one or more services by one or more third-party service providers 140. For example, the request may be a request to process a credit card transaction for the purchase of an item. The first request message may be in a format used by the retail processing system 112 or defined by the documentation associated with the merchant device 115 or interface system 150. The first request message may be encrypted.

A device identifier is retrieved at 403. The device identifier may be retrieved by the merchant device 115 from a memory associated with the merchant device 115. The device identifier may uniquely identify the merchant device 115 to the interface system 150, and may also identify the merchant 110 associated with the merchant device 115. The device identifier may have been provided to the merchant device 115 when the merchant device 115 was manufactured or dynamically, before or after it is deployed to a merchant 110. In some implementations, the interface system 150 may have provided the merchant device 115 with the device identifier remotely through a network 120, for example, or via a direct connection between a personal computer and the merchant device during device deployment.

A second request message is generated from the first message in a format specified by the interface system at 405. The second request message may be the transaction request message 116, and may be generated by the merchant device 115 in a format that is used and/or expected by the interface system 150. The merchant device 115 may further append the retrieved device identifier to the generated second request message. The second request message may be encrypted, optimized, and/or compressed by the merchant device 115. In some implementations, the interface system 150 may periodically change or update the specified format by sending a message or program file to the merchant device 115.

Alternatively, or additionally, the second request message may be in the same format as the first request message, but with the identifier of the merchant device 115 appended to it. In addition, the message with the appended identifier may be compressed, encrypted, or otherwise optimized to be transmitted to the interface system 150.

The second request message is provided to the interface system at 407. The second request message may be provided by the merchant device 115 to the interface system 150. The interface system 150 may receive the second request message and, based on the appended device identifier, may determine a merchant profile associated with the merchant 110. The interface system 150 may then generate and send a formatted transaction request message 151 to a third-party service provider 140 based on the merchant profile and the second request message. The formatted transaction request message 151 may be encrypted and/or compressed.

A response to the second request message is received at 409. The response to the second request message may be received by the merchant device 115 from the interface system 150. The response to the second request message may have been generated by the interface system 150 from a response received from the third-party service provider 140 that received the formatted transaction request message 151. The response to the second request message may either deny or grant the transaction request from the first request message. The response to the second request message may include information about the transaction such as a transaction number or a time that the transaction was completed. The response to the second request message may be encrypted and/or compressed.

A response to the first request message is generated based on the response to the second request message at 411. In some implementations, the response may be generated based on the response to the second request message and a format specified by the retail processing system or defined by documentation associated with the merchant device 110 or interface system 150. The response to the first request message may be encrypted and/or compressed.

The response to the first request message is provided to the retail processing system at 413. The response to the first request message may be provided to the retail processing system 112 by the merchant device 115.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, libraries, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as non-limiting example forms of implementing the claims.

What is claimed:

1. A method comprising:
receiving a transaction request message at a computing device, wherein the transaction request is associated with a merchant of a plurality of merchants;
retrieving a merchant profile associated with the merchant by the computing device, wherein the computing device stores a plurality of merchant profiles, each merchant of the plurality of merchants is associated with a merchant profile of the plurality of merchant profiles, and each merchant profile identifies at least one third-party service provider for the merchant associated with the merchant profile and identifies actions for the computing device to perform based on each type of a plurality of transaction request message types;
based on the retrieved merchant profile associated with the merchant, determining a third-party service provider associated with the transaction request message by the computing device;
retrieving a service profile associated with the determined third-party service provider by the computing device, wherein the computing device stores a plurality of service profiles, and each service profile is associated with a third-party service provider and identifies a format used by the third-party service provider associated with the service profile;
for the determined third-party service provider, generating a formatted transaction request message from the transaction request message using the identified format used by the determined third-party service provider by the computing device; and
sending the formatted transaction request message to the determined third-party service provider by the computing device.

2. The method of claim 1, wherein each merchant profile identifies a format used by the associated merchant, and further comprising:
receiving a response from the third-party service provider indicating that a transaction associated with the formatted transaction request message was completed;
determining a format used by the merchant associated with the received transaction request message using the merchant profile associated with the merchant associated with the received transaction request message;
generating a formatted response to the received transaction request message based on the received response from the third-party service provider and the determined format; and
providing the formatted response message to the merchant associated with the received transaction request message.

3. The method of claim 2, wherein the transaction request message was received from a merchant device, and further comprising providing the generated response to the received transaction request message to the merchant device.

4. The method of claim 1, wherein the transaction request message is a request to process a payment.

5. The method of claim 1, wherein the transaction request message is one or more of a payroll request, an inventory request, a security or fraud related request, a tax collection or reporting request, an alert or notification request, a lease or rental fee collection or remittance request, and a membership fee collection or remittance request.

6. The method of claim 1, wherein each merchant profile further identifies a plurality of third-party service providers, and further wherein determining a third-party service provider associated with the transaction request message further comprises determining a plurality of third-party service providers associated with the transaction request message based on the retrieved merchant profile, retrieving the service profile associated with the determined third-party service provider further comprises retrieving a service profile associated with each of the plurality of determined third-party service providers, and generating a formatted transaction request message from the transaction request message further comprises generating a formatted transaction request message for each of the plurality of third-party service providers.

7. The method of claim 6, wherein the determined plurality of third-party service providers comprises an inventory service provider and a payment processing service provider, and generating a formatted transaction request message for each of the determined plurality of third-party service providers comprises:
generating a formatted transaction request message for the inventory service provider; and
generating a formatted transaction request message for the payment processing service provider.

8. The method of claim 7, wherein the determined plurality of third-party service providers further comprises a tax service provider, and generating a formatted transaction request message for each of the determined plurality of third-party service providers further comprises generating a formatted transaction request message for the tax service provider.

9. The method of claim 7, wherein the determined plurality of third-party service providers further comprises a customer loyalty service provider, and generating a formatted transaction request message for each of the determined plurality of third-party service providers further comprises generating a formatted transaction request message for the customer loyalty service provider.

10. The method of claim 7, wherein the determined plurality of third-party service providers further comprises a fraud prevention service provider, and generating a formatted transaction request message for each of the determined plurality of third-party service providers further comprises generating a formatted transaction request message for the fraud prevention service provider.

11. A system comprising:
a merchant device, implemented by a computer device, and adapted to:
receive a transaction request message from a retail processing system;
retrieve a device identifier, wherein the device identifier uniquely identifies the merchant device;
append the device identifier to the transaction request message; and
provide the transaction request message; and
an interface system, implemented by a computer device, and adapted to:
receive the transaction request message, wherein the transaction request is associated with a merchant of a plurality of merchants;
retrieve a merchant profile associated with the merchant using the appended device identifier, wherein the interface system stores a plurality of merchant profiles, each merchant of the plurality of merchants is associated with a merchant profile of the plurality of merchant profiles, and each merchant profile identifies a plurality of third-party service providers for the merchant associated with the merchant profile and identifies actions for the interface system to perform based on each type of a plurality of transaction request message types;

based on the retrieved merchant profile associated with the merchant, determine a plurality of third-party service providers associated with the transaction request message;

retrieve a service profile associated with each of the determined third-party service providers, wherein the interface system stores a plurality of service profiles, and each service profile is associated with a third-party service provider and identifies a format used by the third-party service provider associated with the service profile;

for at least one of the determined plurality of third-party service providers, generate a formatted transaction request message from the transaction request message using the identified format used by the at least one of the determined plurality of third-party service providers; and send the formatted transaction request message to the at least one of the determined plurality of third-party service providers.

12. The system of claim 11, wherein the transaction request message is encrypted by the merchant device or the interface system.

13. The system of claim 11, wherein the merchant device is a software module.

14. The method of claim 1, further comprising determining a plurality of actions to perform based on a type of the received transaction request message and the retrieved merchant profile, and storing an indicator of at least one action of the determined plurality of actions to be performed at a later time.

* * * * *